United States Patent
Momose et al.

(10) Patent No.: US 6,923,461 B2
(45) Date of Patent: Aug. 2, 2005

(54) STRUT SUSPENSION SYSTEM WITH DUAL-PATH TOP MOUNTS

(75) Inventors: Nobuo Momose, Tokyo (JP); Yuzo Niina, Tokyo (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/181,270

(22) PCT Filed: Nov. 13, 2001

(86) PCT No.: PCT/JP01/09903

§ 371 (c)(1),
(2), (4) Date: Jul. 16, 2002

(87) PCT Pub. No.: WO02/40299

PCT Pub. Date: May 23, 2002

(65) Prior Publication Data

US 2003/0006574 A1 Jan. 9, 2003

(30) Foreign Application Priority Data

Nov. 17, 2000 (JP) ........................ 2000-351296

(51) Int. Cl.$^7$ .............................................. B23B 31/16
(52) U.S. Cl. ............................................ 280/124.155
(58) Field of Search ................... 280/124.155, 124.154, 280/124.145, 124.146, 124.147

(56) References Cited

U.S. PATENT DOCUMENTS

| | | | | |
|---|---|---|---|---|
| 4,274,655 A | * | 6/1981 | Lederman | 280/124.155 |
| RE31,184 E | * | 3/1983 | Lederman | 280/124.155 |
| 5,308,048 A | * | 5/1994 | Weaver et al. | 267/220 |
| 5,382,044 A | * | 1/1995 | Smith et al. | 280/124.109 |
| 5,454,585 A | * | 10/1995 | Dronen et al. | 280/124.145 |
| 5,467,971 A | | 11/1995 | Hurtubise et al. | |
| 6,155,543 A | * | 12/2000 | Solomond et al. | 267/216 |
| 6,296,396 B1 | | 10/2001 | Schwarzbich | |
| 6,412,798 B2 | * | 7/2002 | De Fontenay et al. | 280/124.147 |
| 6,666,311 B1 | | 12/2003 | Schütz | |
| 2002/0009250 A1 | | 1/2002 | Schwarzbich | |

FOREIGN PATENT DOCUMENTS

| | | |
|---|---|---|
| EP | 1 000 781 | 5/2000 |
| JP | 58-32002 | 3/1983 |
| JP | 2000-145800 | 5/2000 |
| WO | WO 89/05242 A1 | 6/1989 |

* cited by examiner

*Primary Examiner*—Michael J. Carone
*Assistant Examiner*—M. Thomson
(74) *Attorney, Agent, or Firm*—Birch, Stewart, Kolasch & Birch, LLP

(57) ABSTRACT

A strut suspension system with dual-path top mounts is provided with a first input system and a second input system. In the first input system, an upper part of a piston rod (5a) of a shock absorber (5) arranged on a strut (4) is connected to a vehicle body (7) via an insulator (10c) when the strut suspension system is arranged on an automotive vehicle. In the second input system, an upper part of a coil spring (6) arranged on an outer circumference of the strut (4) is connected to the side of the vehicle body (7) via an upper spring seat (8c) and a bearing (9c) when the strut suspension system is arranged on the automotive vehicle. To permit suppressing deflection of the vehicle by reducing a total steer moment applied to the suspension system without resulting in an increase in the number of parts, a lower bracket (16) is arranged in contact with a lower surface of the insulator (10c) and between the bearing (9c) and the vehicle body (7), and is formed such that the lower bracket downwardly extends to greater extent on an inner side thereof as viewed in a lateral direction of the vehicle (7) than on an outer side thereof to have an axis of rotation of the bearing and a king pin axis (20) coincided with each other (FIG. 2).

6 Claims, 7 Drawing Sheets

F I G. 4
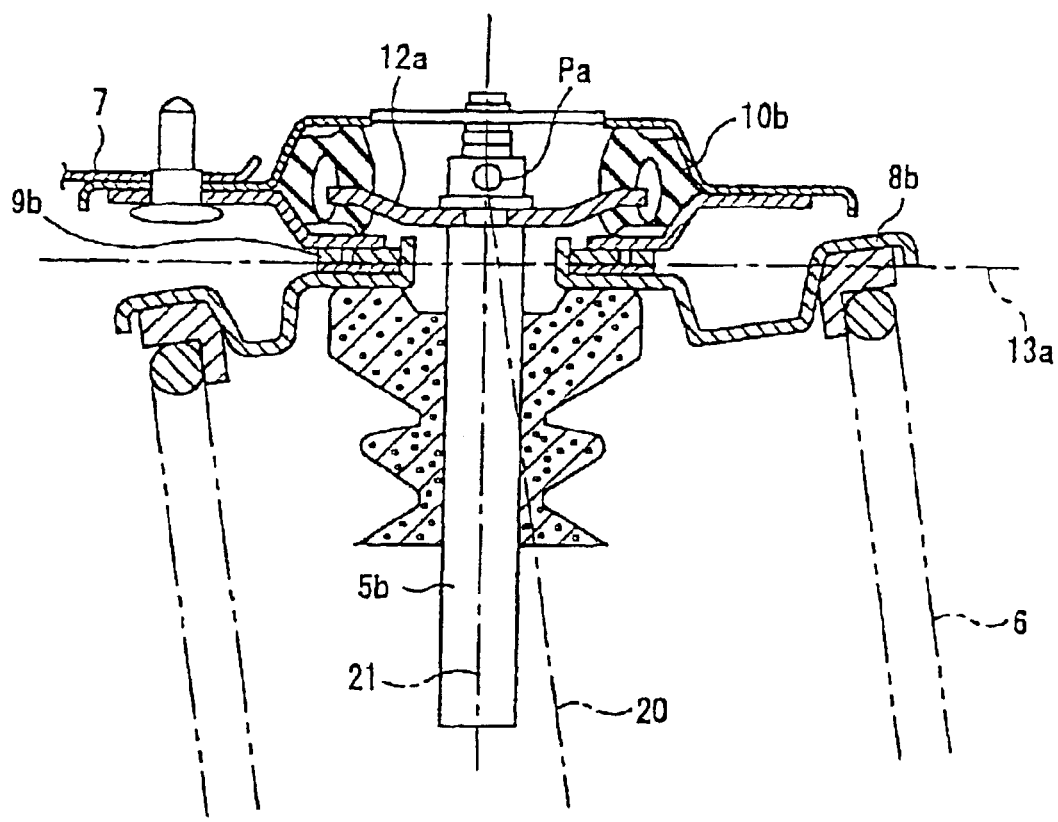

STRUT SUSPENSION SYSTEM WITH DUAL-PATH TOP MOUNTS

This application is the national phase under 35 U.S.C. § 371 of PCT International Application No. PCT/JP01/09903 which has an International filing date of Nov. 13, 2001, which designated the United States of America.

TECHNICAL FIELD

This invention relates to a strut suspension system with dual-path top mounts, in which an upper part of a strut and an upper part of a coil spring are connected to a vehicle body independently from each other.

BACKGROUND ART

Strut suspension systems for automobiles are used to suspend steered wheels and include, for example, one having such a structure as illustrated in FIG. 3. In this strut suspension system, a knuckle 2 connected to a wheel 1 via a bearing is connected to a vehicle body 7 by a lower arm 3 and a strut 4.

As is illustrated in FIG. 3, the strut 4 is provided with a shock absorber 5 having a cylinder tube 5a and a piston rod 5b, and a coil spring 6 is arranged around the shock absorber 5. The cylinder tube 5a is connected at a lower end portion thereof to an upper part 2B of the knuckle 2, and an upper end portion of the piston rod 5b, said upper end portion extending upwardly from an upper end portion of the cylinder tube 5a, is connected at a top end thereof to the vehicle body 7. The coil spring 6 is connected at a lower end thereof to an outer circumference of the cylinder tube 5a, and is connected at an upper end thereof to the vehicle body 7.

The strut suspension system illustrated in FIG. 3 is of the single-path top mount structure that the piston rod 5b and the coil spring 6 are integrally connected with each other at the upper ends thereof. From an upper part of the strut 4 to the vehicle body 7, are action force from a road surface is inputted along a single path after its transmission by way of the shock absorber 5 and the coil spring 6.

Described specifically, an upper spring seat 8a is fixedly arranged on an outer circumference of the upper end of the piston rod 5b, and the upper end of the coil spring 6 is connected to the upper spring seat 8a and is hence connected integrally with the upper end of the piston rod 5b. The piston rod 5b is connected at the upper end thereof to the vehicle body 7 via a bearing 9a and an insulator 10a. Incidentally, the coil spring 6 is connected at the lower end thereof to the lower spring seat 11 fixedly arranged on the outer circumference of the cylinder tube 5a.

Illustrated in FIG. 4, on the other hand, is a strut suspension system of the dual-path top mount structure that an upper end of a piston rod 5b and an upper end of a coil spring 6 are independent from each other. From an upper part of a strut 4 to a vehicle body 7, a reaction force from a road surface is inputted along dual paths via a shock absorber S and a coil spring 6.

Described specifically, a plate 12a is fixedly arranged on an outer circumference of the upper end of the piston rod 5b, an insulator 10b is disposed on a strut attachment portion of the vehicle body 7 such that the plate 12a is held on upper and lower sides thereof by the insulator 10b, and the piston rod 5b is connected at the upper end thereof to the vehicle body via the insulator 10b. Below the insulator 10b on the strut attachment portion of the vehicle body 7, on the other hand, a spring seat 8b is arranged with a bearing 9b interposed between the spring seat 8b and the insulator lob, and the coil spring 6 is connected at the upper end thereof to the spring seat 8b. Incidentally, the coil spring 6 is at an lower end thereof to a lower spring seat 11 fixedly arranged on an outer circumference of a cylinder tube 5a, as in the strut suspension system of the single-path top mount structure (see FIG. 3).

The wheel 1 is steered about a king pin axis 20 as illustrated in FIG. 3. The king pin axis 20 is a straight line, which extends between an upper support point Pa of the strut 4 and a lower support point Pb of the knuckle 2. The strut 4 and the knuckle 2 are pivotally supported at the upper support point Pa by the insulator 10a (10b) and the bearing 9a (9b) and at the lower support point Pb by an unillustrated ball joint, respectively, such that the strut 4 and the knuckle 2 are both rotatable about the king pin axis 20.

For the structural constraints around the wheel, it is difficult to have the king pin axis 20 and an axis 21 of the strut 4 coincided with each other. No matter whether a strut suspension system is of the single-path top mount structure or of the dual-path top mount structure, the king pin axis 20 is generally inclined toward the outboard side of the vehicle 7 relative to the axis 21 of the strut 4 as depicted in FIG. 3.

Further, a plane 13a of rotation of the spring seat 8a (8b), said plane 13a being equivalent to a plane of rotation of the bearing 9a (9b) in the illustrated prior art strut suspension systems, is generally set to lie in a plane which is perpendicular to the axis 21 of the strut but is inclined (not perpendicular) relative to the king pin axis 20.

In the strut suspension system of the dual-path top mount structure that the top end of the piston rod 5b and the top end of the coil spring 6 are independent from each other, a moment (steer moment) which causes the strut 4 to rotate is therefore produced by spring reaction force from the coil spring 6 although such a moment does not occur in the strut suspension system of the single-path top mount structure that the piston rod 5b and the coil spring 6 are integrally connected together at the upper ends thereof. This moment acts as a cause of a deflection of a vehicle and has posed a problem.

Factors of occurrence of such a steer moment will now be discussed. A discussion will firstly be made about a left wheel with reference to FIG. 5A and FIG. 5B. Reaction force from the coil spring 6 to the side of the vehicle body 7 is applied toward an outer side of a line, which extends between an application point (upper point of application of force) P1 and an application point (lower point of application of force) P2, at both of the force application points.

Now imaging an x-y-z coordinate system, in which the king pin axis 20 extends as a z-axis and, in a plane lying at a right angle relative to the z-axis (king pin axis 20) and including the upper force application point P1, the longitudinal direction of the vehicle body extends as an x-axis and the lateral direction of the vehicle body extends as a y-axis, the x,y-coordinates of the upper force application point P1 is (x,y) Further, x,y components of applied force F at the upper force application point P1 will be designated as (Fx,Fy).

Also imagine an x'-y'-z' coordinate system, in which the axis 21 of the strut 4 extends as a z'-axis and, in a plane lying at a right angle relative to the z'-axis and including the upper force application point P1 (which plane serves as a plane of rotation for the upper spring seat 8), the longitudinal direction of the vehicle body extends as an x'-axis and the lateral direction of the vehicle body extends as a y'-axis. Assuming that an angle between the z-axis (king pin axis 20) and the z'-axis [the axis 21 of the strut 4 which lies at a right angle relative to the plane 13 of rotation of the upper spring seat 8b] is θ and also that an offset of the z'-axis (axis of rotation of the upper spring seat 8b) in the direction of the y-axis relative to the z-axis (king pin axis 20) on the x-y plane is δ [see FIG. 5C; δ generally takes a negative value], the x'y'-coordinates of the upper force application point P1 is expressed by:

(x,(y−δ)·cos θ)≈(x,y−δ)  (∵θ: very small)

Expressing the components (Fx',Fy') in the x'-y' plane (the plane of rotation of the upper spring seat 8b) of the applied force F at the upper application point P1 by using x and y, these components can be defined as follow:

(Fx,Fy·cos θ+Fz·sin θ)  [see FIG. 6B]

Accordingly, a moment M1 about the axis of rotation of the upper spring seat 8b (z'-axis) by the applied force F at the upper force application point P1 can be expressed as follow:

$$M1 = x \cdot (Fy \cdot \cos\theta + Fz \cdot \sin\theta) - (y-\delta) \cdot Fx \qquad (1)$$

This moment M1 is transmitted downwardly via the coil spring 6. If the coil spring 6 is taken as a universal joint, the moment M1 acts approximately as a moment about the king pin axis 20.

Supposing that the distance between the upper force application point P1 and the lower force application point P2 is H, the x,y-coordinates of the lower force application point P2 in the x-y-z coordinate system are:

(x−Fx/Fz·H, y−Fx/Fy·H)

Components (x,y components) of applied force F at the lower force application force P2, said components being perpendicular to the z-axis (king pin axis 20), are:

(−Fx,−Fy)

Therefore, a moment M2 about the axis of rotation of the lower spring seat 11 (z-axis) by the applied force F at the lower force application point P2 can be expressed as follow:

$$M2 = -(x - Fx/Fz \cdot H) \cdot Fy + (y - Fx/Fy \cdot H) \cdot Fx \qquad (2)$$
$$= -x \cdot Fy + y \cdot Fx$$

As a steer moment $M_L$ by a reaction force from the coil spring 6 via the upper and lower spring seats is the sum of M1 and M2, $$M_L = x \cdot (Fy \cdot \cos\theta + Fz \cdot \sin\theta) - (y-\delta) \cdot Fx - x \cdot Fy + y \cdot Fx \qquad (3)$$
$$= x \cdot (Fy \cdot (\cos\theta - 1) + Fz \cdot \sin\theta) + \delta \cdot Fx$$

The steer moment $M_L$ by the reaction force from the coil spring 6 as described above is applied to the left wheel. When the same strut assembly is commonly used for both the left and right wheels (in other words, the coil spring 6 is used commonly on both sides), a steer moment $M_R$ applied to the right wheel is the same as $M_L$ applied to the left wheel (see FIG. 7).

$$M_R = x \cdot (Fy \cdot (\cos\theta - 1) + Fz \cdot \sin\theta) + \delta \cdot Fx \qquad (4)$$

Therefore, a total steer moment M by the reaction force from the coil spring 6 is:

$$M = M_L + M_R \qquad (5)$$
$$= 2 \cdot (x \cdot (Fy \cdot (\cos\theta - 1) + Fz \cdot \sin\theta) + \delta \cdot Fx)$$

Steer moments applied to the suspension systems of a vehicle include, in addition to reaction forces from the coil springs 6 of the suspension systems for both the left and right wheels, those produced by tire reaction forces $M_{TL}$, $M_{TR}$ from the left and right wheels as illustrated in FIG. 7. As these tire reaction forces $M_{TL}$,$M_{TR}$ are cancelled out by the left and right wheels, it is a steer moment produced by reaction force from the coil spring 6 that causes a deflection of the vehicle.

Deflection of the vehicle can, therefore, be suppressed if the total steer moment M by reaction force from the coil spring 6 can be reduced.

The total steer moment M depends significantly upon the x-coordinate x of the upper force application point P1 (namely, the longitudinal offset of the upper force application point P1 relative to the king pin axis 20) and the angle θ between the z-axis (king pin axis 20) and the z'-axis (the axis 21 of the strut 4) (in other words, the angle formed between the plane, which lies at a right angle relative to the king pin axis 20, and the plane 13a of rotation of the upper spring seat 8b).

If the longitudinal offset x of the upper force application point P1 relative to the king pin axis 20 is reduced, the total steer moment M is rendered smaller, thereby making it possible to suppress deflection of the vehicle. This, however, requires extremely difficult work that the positioning of the upper force application point 1 is performed in the manufacturing process. Therefore it is not easy to reduce the offset x.

JP 2,715,666 B discloses a strut suspension system in which an axis of rotation of a rolling bearing on an upper part of a strut is arranged coaxially with a king pin axis. Since this strut suspension system is of the single-path top mount structure, spring reaction force does not become a cause of occurrence of a steer moment, and the problem that is to be solved by the present invention does not arise. The invention disclosed in this Japanese patent publication is, therefore, different in technical field different from the present invention.

U.S. Pat. No. 5,454,585, on the other hand, discloses a strut suspension system with dual-path top mounts constructed such that, as shown in FIG. 8 of this application, a plane of rotation of an upper spring seat 110 is arranged to lie substantially at a right angle relative to a king pin axis 130 and that an axis of rotation of a rolling bearing (bearing assembly) 120 at an upper part of a strut is substantially coaxial with the king pin axis 130. According to this construction, deflection of a vehicle can be suppressed by reducing a total steer moment which applies to the suspension system.

The bearing assembly 120 is composed of an upper, stationary-side member 122, a lower, rotating-side member 124, and balls 126 interposed between these upper and lower members. A suspension spring 140 is connected at an upper end thereof to an upper spring seat 110 via a rubber seat 142. Further, a vibration isolating rubber 152 is arranged on an upper end portion of a piston rod 150 of a shock absorber, and the vibration isolating rubber 152 is covered around a circumference thereof by a dust cover 154. The piston rod 150 is connected at an upper end portion thereof to a vehicle body via a rubber body 180 with core members 182,184 embedded therein.

According to this technique, however, a spacer (wedge) 170 of a wedge shape which corresponds to an inclination of an axis 156 of the shock absorber and that of the king pin axis 130 is interposed between a mount surface 160 of the rubber body 180 and the bearing assembly 120 to adjust the angle of the upper spring seat 110 and that of the bearing assembly 120. In other words, the upper spring seat 110 and the bearing assembly 120 are connected to the vehicle body via the wedge 170 and the mount surface 160 of the rubber body 180. Therefore the wedge 170 is newly required, leading to an increase in the number of parts.

Further, the bearing assembly 120 is arranged on the upper spring seat 110 such that they are substantially in series with each other. This arrangement is, however, disadvantageous in decreasing the axial length of the suspension and increasing the effective length of the suspension.

The present invention has been completed with the foregoing problems in view, and as objects, has the provision of a structure that in a strut suspension system with dual-path top mounts, a total moment applied to the suspension system can be reduced to suppress deflection of a vehicle without an increase in the number of parts and also the provision of a structure that in a strut suspension system with dual-path top mounts, the axial direction and effective length of the suspension system can be advantageously reduced and increased, respectively.

DISCLOSURE OF THE INVENTION

According to the present invention, there is thus provided a strut suspension system with dual-path top mounts, the strut suspension system being provided with:

a first input system in which an upper part of a piston rod of a shock absorber arranged on a strut is connected to a side of a vehicle body via an insulator, and a second input system in which an upper part of a coil spring arranged on an outer circumference of the strut is connected to the side of the vehicle body via an upper spring seat and a bearing, characterized in that:

the strut suspension system comprises a lower bracket arranged in contact with a lower surface of the insulator and between the bearing and the vehicle body and formed such that the lower bracket downwardly extends to greater extent on an inner side thereof as viewed in a lateral direction of the vehicle than on an outer side thereof to have an axis of rotation of the bearing and a king pin axis coincided with each other.

This makes it possible to have the axis of rotation of the bearing and the king pin axis coincided with each other by the extremely simple measure that the lower bracket is changed in configurations.

Preferably, the lower bracket may be configured to have, on a contact portion thereof with the insulator, a plane lying at a right angle to a strut axis and, on a bearing support portion thereof for the bearing, a plane lying at a right angle to the king pin axis. This makes it possible to bear damping force of the shock absorber, downward force, in the direction of the strut axis by the lower bracket, a single part, alone. In addition, this also makes it possible to bear force from the second input system in the direction of the king pin axis.

The lower bracket may preferably be provided on an outer circumference of the insulator contact portion thereof with the bearing support portion. This makes it, possible to avoid interference between the insulator and the bearing even when they are arranged at the same height in the direction of an axis of the strut. This also makes it possible to use conventional parts as members other than the lower bracket, such as the insulator and the bearing.

Preferably, the strut suspension system with dual-path top mounts may further comprise a bump rubber arranged on an outer circumference of the piston rod, and the bump rubber may be disposed below the insulator with only the lower bracket interposed therebetween. This makes it possible to arrange the bump rubber at a still higher level and hence to set the strut shell longer. Accordingly, the lateral rigidity of the strut can be improved, contributing to improvements in driving stability.

The bump rubber may preferably be at an upper end thereof in contact at an upper end thereof with a plane which lies at a right angle to the strut axis at the contact portion of the lower bracket with the insulator. This allows the bump rubber to adequately exhibit its bump stopper effect along the direction of plunger extensions and contractions of the shock absorber.

BRIEF DESCRIPTION OF THE DRAWINGS

FIGS. 1A and 1B are schematic perspective views showing the construction of a lower bracket useful for arrangement in a strut suspension system with dual-path top mounts according to an embodiment of the present invention, in which FIG. 1A is an upper perspective view of the lower bracket as seen from the side of its upper surface and FIG. 1B is a lower perspective view of the lower bracket as seen from the side of its lower surface;

FIG. 4 is a schematic fragmentary vertical cross-sectional view of a conventional strut suspension system with dual-path top mounts;

FIG. 5A to FIG. 5C are diagrams illustrating a problem in the conventional strut suspension system with dual-path top mounts, in which FIG. 5A is a side view of a left-side, steered wheel, FIG. 5B is a rear view of the left-side, steered wheel, and FIG. 5C is an enlarged view of a portion A in FIG. 5(B);

BEST MODES FOR CARRYING OUT THE INVENTION

Figure 1A:
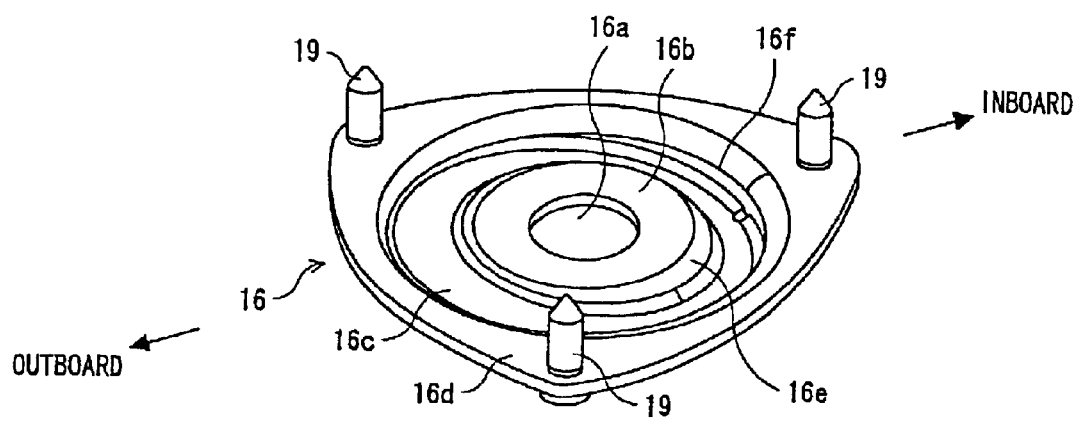

With reference FIGS. 1A, 1B and 2 of the accompanying drawings, a description will hereinafter be made about the embodiment of the present invention. Reference will also be had to FIG. 3 in some of the description, because the construction of a lower part of this suspension system is similar to that of the conventional suspension system shown in FIG. 3.

The strut suspension system with dual-path top mounts according to this embodiment is used to suspend a steered wheel. As illustrated in FIG. 3, a knuckle 2 connected to a wheel 1 via a bearing is connected to a vehicle body 7 via a lower arm 3 and a strut 4. The lower arm 3 connects a lower part 2A of the knuckle 2 to the vehicle body 7. The strut 4 is provided with a shock absorber 5 which has a cylinder tube 5a and a piston rod 5b. Around the shock absorber 5 via which an upper part 2B of the knuckle 2 is connected to the vehicle body 7, a coil spring 6 is arranged. The cylinder tube 5a is connected at a lower end portion thereof to the upper part 2B of the knuckle 2, and the coil spring 6 is connected at a lower end thereof to a lower spring seat 11 fixedly arranged on an outer circumference of the cylinder tube 5a.

Figure 2:
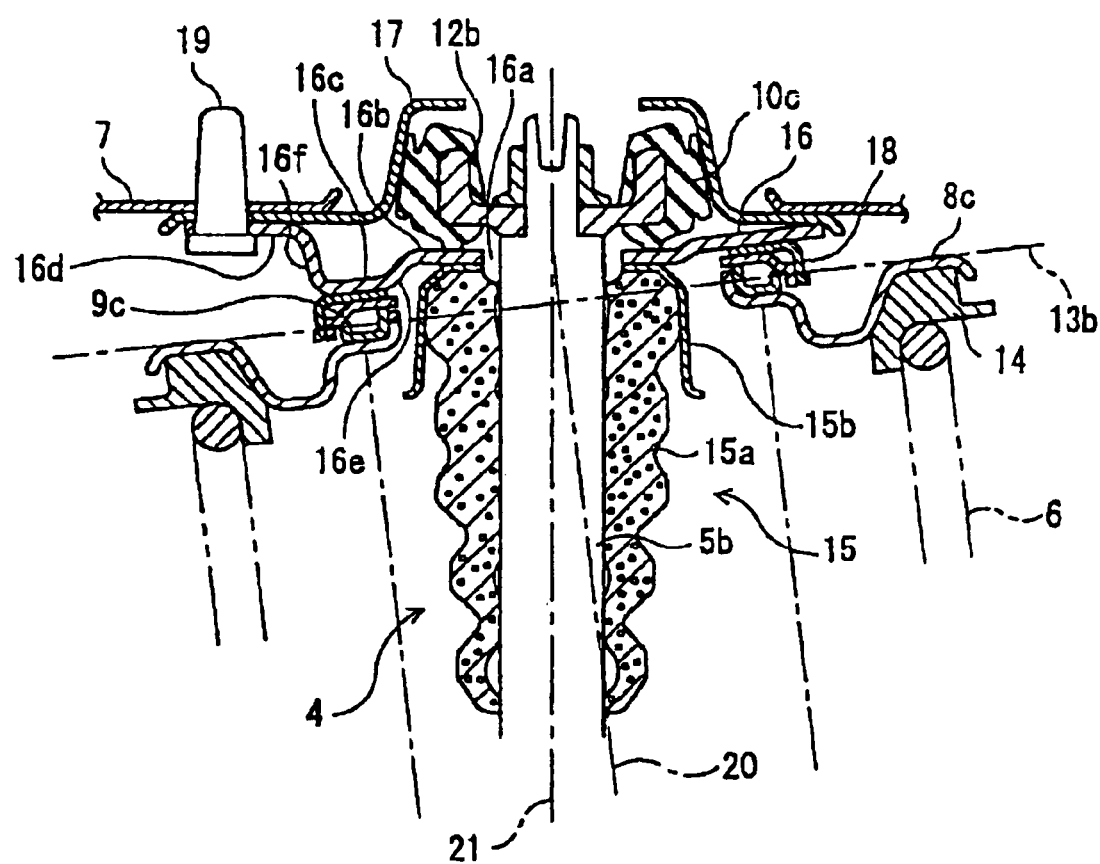
FIG. 2 is a schematic fragmentary vertical cross-sectional view of the strut suspension system with dual-path top mounts according to the embodiment of the present invention.
Figure 3:
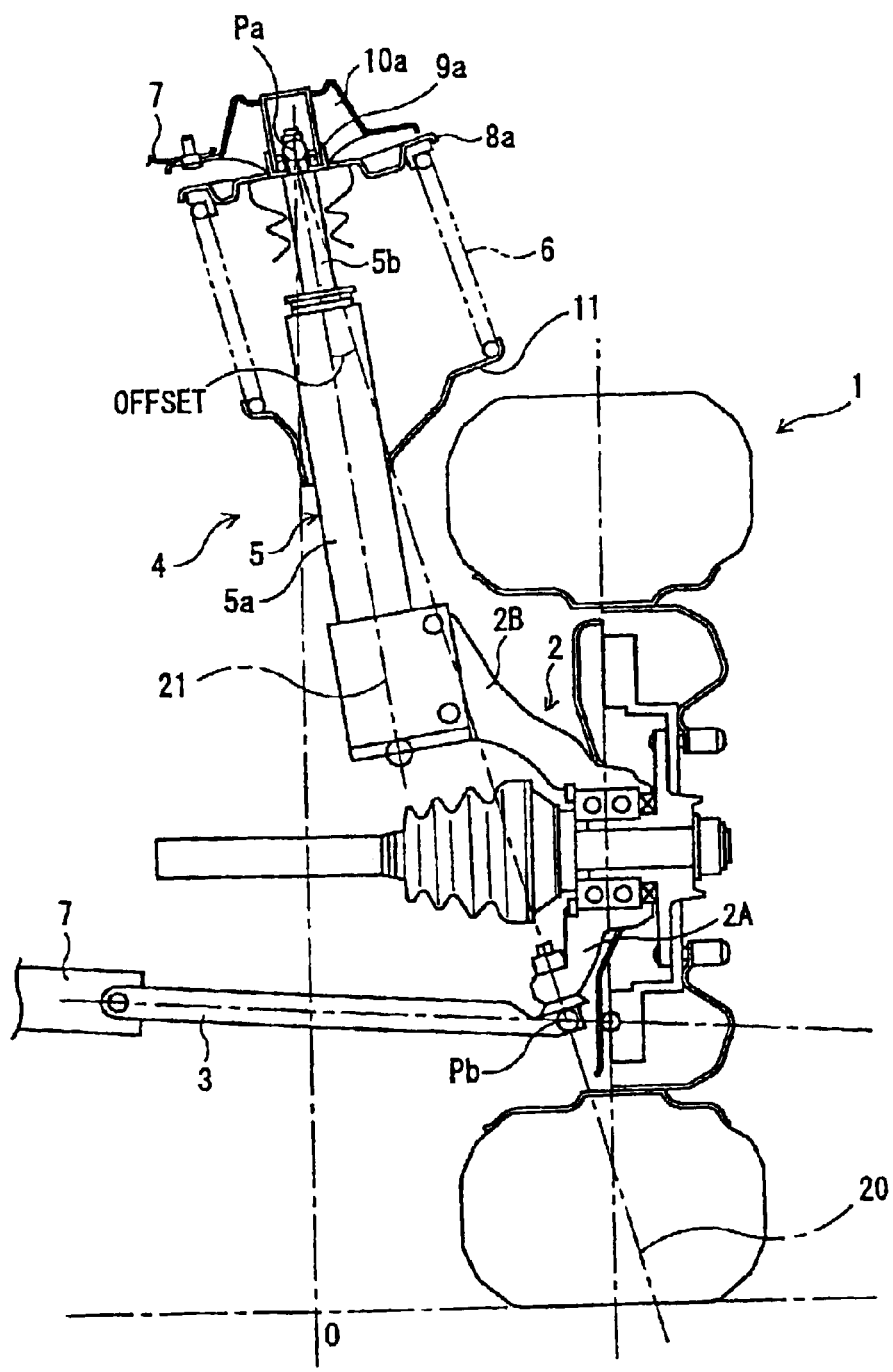
FIG. 3 is a schematic fragmentary vertical cross-sectional view of a conventional strut suspension system with single-path top mounts.
Figure 5A:
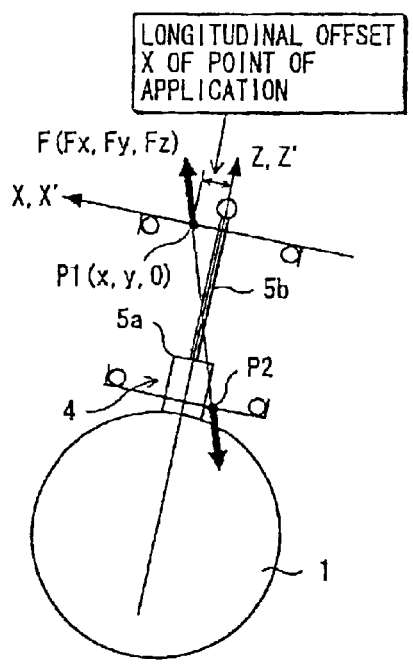
Figure 5B:
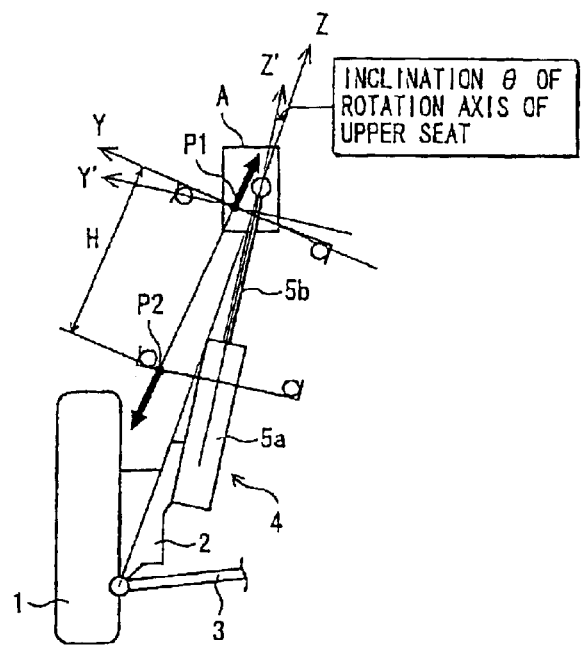
Figure 5C:
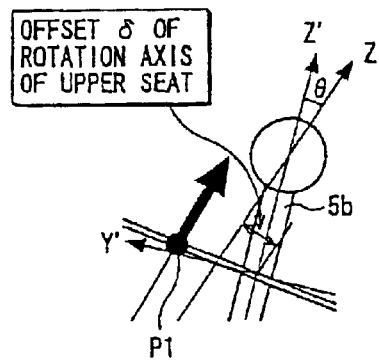
Figures 6A, 6B:
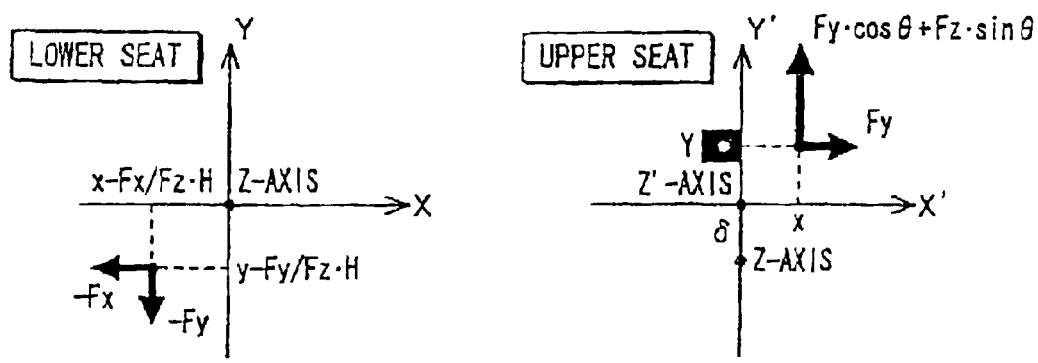
FIG. 6A and FIG. 6B are diagrams illustrating another problem in the conventional strut suspension system with dual-path top mounts, in which FIG. 6A diagrammatically illustrates reaction force by a lower spring seat and FIG. 6B diagrammatically illustrates reaction force by an upper spring seat.
Figure 7:
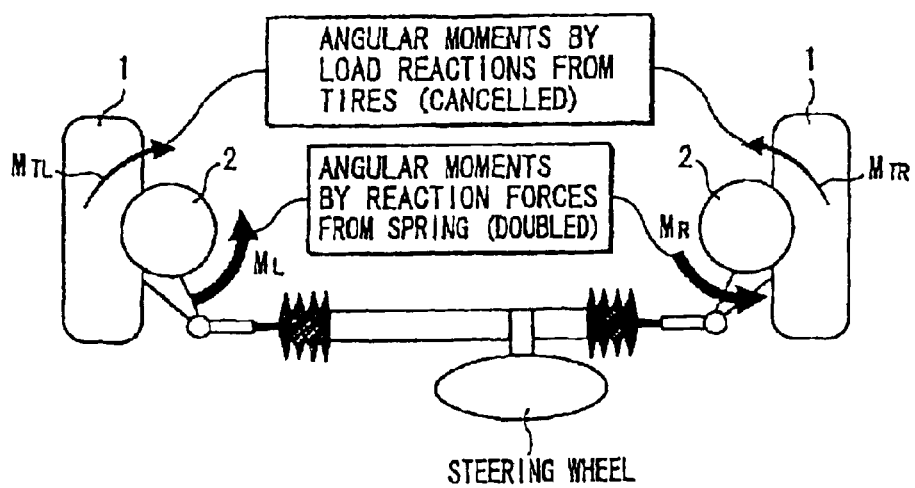
FIG. 7 is a schematic plan view illustrating a further problem in the conventional strut suspension system with dual-path top mounts, and shows moments applied to steered wheels.
Figure 8:
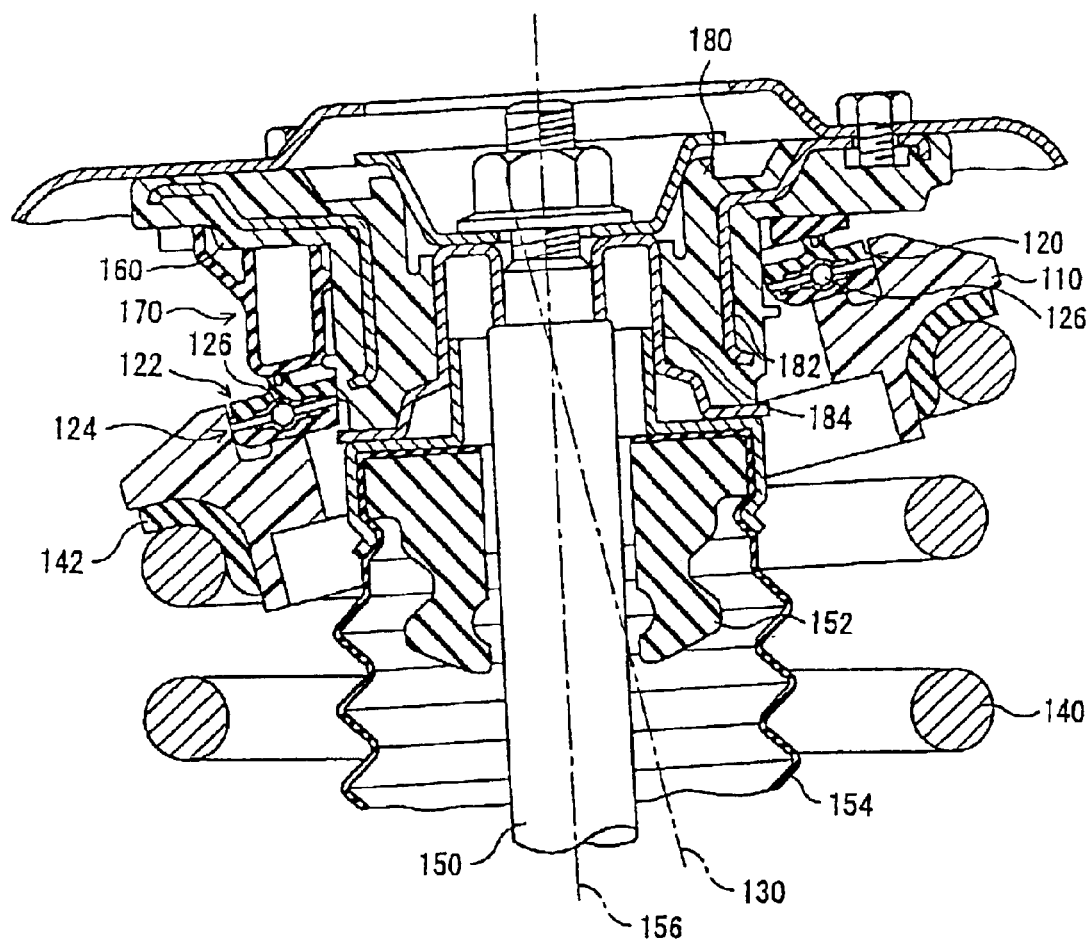
FIG. 8 is a fragmentary vertical cross-section showing another conventional strut suspension system with dual-path top mounts.

As shown in FIG. 2, an upper part of the strut 4 is constructed as a dual-path top mount structure that an upper end of the piston rod 5b and an upper end of the coil spring 6 are independent from each other, so that reaction force from a road surface is inputted from a the upper part of the strut 4 to the vehicle body 7 along dual paths of the shock absorber 5 and the coil spring 6.

Described specifically, a plate 12b is fixedly arranged on an outer circumference of the upper end of the piston rod 5b. On a strut attachment portion of the vehicle body 7, an insulator 10c is disposed such that the plate 12b is held on upper and lower sides thereof by the insulator 10c. The insulator 10c is supported on a lower side thereof by a lower bracket 16 and on an upper side thereof by an upper bracket 17. Accordingly, the piston rod 5b is connected at the upper end thereof to the vehicle body 7 via the insulator 10c, the lower bracket 16 and the upper bracket 17, thereby constructing a first input system via which an input of load from the side of the wheel 1 to the side of the vehicle body 7 is effected by way of the shock absorber 5 and the insulator 10c.

On a lower part of the lower bracket 16 located below the insulator 10c at the strut attachment portion of the vehicle 7, on the other hand, an upper spring seat 8c is arranged via a bearing bracket 18 and a bearing (plain bearing) 9c. The coil spring is connected at the upper end thereof to the upper spring seat 8c via a rubber seat 14. A second input system is, therefore, constructed such that an input of load from the side of the wheel 1 to the side of the vehicle body 7 is effected by way of the coil spring 6, the rubber seat 14, the upper spring seat 8c, the bearing 9c, the bearing bracket 18 and the lower bracket 16.

An outer circumference of an upper end portion of the piston rod 5b is covered with a bump rubber 15. This bump rubber 15 elastically limits contractions of the shock absorber 5, and in this embodiment, is constructed of a bump rubber main body 15a formed of urethane, which is light in weight, relatively soft and flexible and economical, and a deformation preventing cup 15b arranged on an outer circumference of a base portion (an upper end portion as viewed in FIG. 2) of the bump rubber main body 15a.

The deformation preventing cup 15b is arranged, because in the case of the urethane-made bump rubber main body 15a, substantial deformations tend to occur. This cup 15b functions such that the bumper rubber main body 15a is prevented from undergoing excessive deformations and is also heightened in rigidity.

In the strut suspension system with dual-path top mounts according to this embodiment, a plane 13b of rotation of the upper spring seat 8c is set in a direction perpendicular to a king pin axis 20. In this embodiment, the bearing 9c is interposed between the upper spring seat 8c and the vehicle body 7, and an axis of rotation of the bearing 9c is set coaxially with the king pin axis 20.

This construction has been realized by modifying the lower bracket 16 in configurations.

Figure 1B:
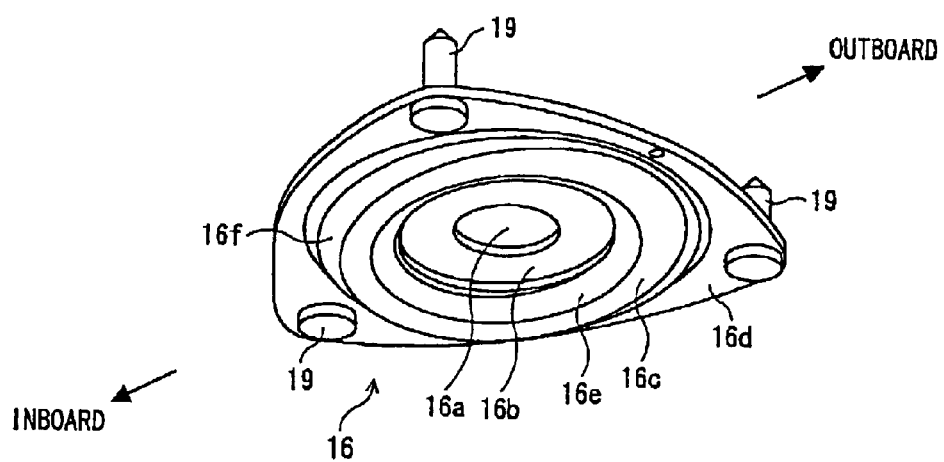

Described specifically, the lower bracket 16, as depicted in FIG. 1A and FIG. 1B, is provided with a hole 16a centrally formed through the lower bracket, an insulator contact portion 16b directly arranged on and along an outer periphery of the hole 16a, a bearing support portion 16c arranged on and along an outer periphery of the insulator contact portion 16b, and a vehicle body connection portion 16d arranged on and along an outer periphery of the bearing support portion 16c. Referring back to FIG. 2, the piston rod 5b extends through the hole 16a, the insulator contact portion 16b is in contact with the lower side of the insulator 10c, the bearing support portion 16c is joined with the upper surface of the bearing bracket 18 on which the bearing 9c is supported, and the vehicle body connection portion 16d is upwardly connected to the vehicle body 7 by bolts 19.

As shown in FIG. 1A, FIG. 1B and FIG. 2, an annular surface of the insulator contact portion 16b is substantially parallel with an annular surface of the vehicle body connection portion 16d, while an annular surface of the bearing support portion 16c is oblique not only relative to the annular surface of the vehicle body connection portion 16d but also relative to the annular surface of the insulator contact portion 16b. In other words, the bearing support portion 16c of the lower bracket 16 is formed such that the bearing support portion 16c downwardly extends to greater extent on an inner side thereof as viewed in a lateral direction of the vehicle body than on an outer side thereof. Further, the annular surface of the bearing support portion 16c is arranged in a direction perpendicular to the king pin axis 20, while the annular surface of the insulator contact portion 16b is arranged in a direction perpendicular to a strut axis (the axis of the strut 4) 21.

The above-described configurations of the lower bracket 16 can be realized by making both of the height of a bank (slant surface) 16e between the bearing support portion 16c and the insulator contact portion 16b and the height of a bank (slant surface) 16f between the bearing support portion 16c and the vehicle body connection portion 16d greater on the inner side of the vehicle body and smaller on the outer side of the vehicle body. In this embodiment, the lower bracket 16 was configured as described above by press-forming a metal plate.

The above-described bump rubber 15 (bump rubber main body 15a+deformation preventing cup 15b) is in contact with the annular surface of the insulator contact portion 16b of the lower bracket 16, and is arranged below the insulator 10c with only the lower bracket 16 made of a metal plate of a small thickness being interposed therebetween. Accordingly, the bump rubber 15 is arranged at a high level extremely close to the insulator 10c. As the deformation preventing cup 15b is also made of a metal plate of an extremely small thickness, the bump rubber main body 15a itself is also arranged at a high level extremely close to the insulator 10c. As a consequence, the strut shell can be set longer.

As the strut suspension system with dual-path top mounts according to this embodiment of the present invention is constructed as mentioned above, an angle θ formed between a straight line, which is perpendicular to the plane 13b of rotation of the upper spring seat 8c at an intersection between the plane 13b of rotation and the king pin axis 20, and the king pin axis 20 is set at 0. Further, the axis of rotation of the bearing 9c is set coaxially with the king pin axis 20, and an offset δ of the axis of rotation of the upper spring seat 8c relative to the king pin axis 20 is set at 0.

Therefore, the above-described total steer moment M by reaction force from the coil spring 6 is expressed by:

$$M = 2 \cdot x \cdot (Fy \cdot (\cos\theta - 1) + Fz \cdot \sin\theta) + \delta \cdot Fx \quad (5)$$
$$= 0$$

The total steer moment M becomes 0, thereby making it possible to suppress deflection of the vehicle.

As a result, it has become possible to easily and surely suppress deflection of a vehicle without needing extremely difficult work that the above-described positioning at the upper force application point P1 is performed in the manufacturing process.

Even if the axis of rotation of the upper spring seat 8c (in other words, the axis of rotation of the bearing 9c) is offset a little relative to the king pin axis 20, in other words, even if the axis of rotation of the bearing 9c is not coaxial with the king pin axis 20, setting of the plane 13b of rotation of the spring seat 8c in a direction perpendicular to the king pin axis 20 renders the total steer moment M extremely small because M=δ,Fx and δ and Fx are both very small.

As has been described above, if the total steer moment M can be rendered extremely small, deflection of the vehicle can be easily and surely suppressed without needing the extremely difficult work that the positioning of the upper force application point P1 is performed in the manufacturing process.

Since the directional setting of the plane of rotation of the upper spring seat 8c such that the axis of rotation of the bearing and the king pin axis are brought into coincidence with each other as described above is effected by the extremely simple measure that the lower bracket 16 is modified in configurations as described above, the assembly can be easily performed without any increase in the number of parts while reducing an increase in cost.

The lower bracket 16 is made of the metal plate and can be easily formed by press-forming. In this respect, an increase in cost can be reduced.

By the lower bracket 16, a single part, alone, downward force of damping force of the shock absorber (force from the first input system) can be borne in the direction of the strut axis and force from the coil spring 6 (force from the second input system) can be borne in the direction of the king pin axis, thereby further simplifying the construction of the strut suspension system.

As the bearing support portion 16c is arranged on and along the outer periphery of the insulator contact portion 16b in the lower bracket 16, the insulator 10c and the bearing 9c do not interfere each other even if they are arranged at substantially the same height in the direction of the strut axis. The suspension system can, therefore, be formed compact in the direction of the strut axis.

As the insulator 10c, the bearing 9c and the like can be set rather freely in configurations without affecting each other, conventional parts can be commonly used for members other than the lower bracket, such as the insulator 10c and the bearing 9c.

Moreover, the bump rubber 15 is arranged below the insulator 10c with only the lower bracket 16 made of the thin metal plate being interposed therebetween, and the bump rubber 15 (also including the bump rubber main body 15a, obviously) is arranged at a high level extremely close to the insulator 10c. Accordingly, the strut shell can be set longer. It is thus possible to improve the lateral rigidity of the strut, thereby contributing to an improvement in the driving stability.

The upper end of the bump rubber is in contact with the plane which is perpendicular to the strut axis at the insulator contact portion of the lower bracket. The bump rubber can, therefore, adequately exhibit its bump stopper effect along the direction of plunger extensions and contractions of the shock absorber.

It is to be noted that the above-described embodiment is merely an example. Therefore, the present invention shall not be limited to such an embodiment and can be practiced by modifying the above-described embodiment in various ways without departing from the spirit of the present invention.

For example, the lower bracket maybe made of a resin insofar strength is assured although the lower bracket was formed of a metal plate in the above-described embodiment. Use of such a resin permits easier formation.

Industrial Applicability

As has been described above, the strut suspension system with dual-path top mounts according to the present invention makes it possible to set the plane of rotation of the upper spring seat, on which the upper part of the coil spring is supported, in a direction perpendicular to the king pin axis which is a hypothetical axis of rotation when the associated steered wheel is steered. It is, therefore, possible to suppress occurrence of a steer moment (a moment which causes the strut to rotate) by spring reaction force from the coil spring and hence to prevent deflection of the vehicle.

Accordingly, the present invention, when applied to the suspensions of an automotive vehicle, can improve the performance of the vehicle at low cost and is believed to have extremely high utility.

What is claimed is:

1. A strut suspension system with dual-path top mounts, said strut suspension system comprising:
    a first input system in which an upper part of a piston rod of a shock absorber arranged on a strut is connected to a side of a vehicle body via an insulator, and
    a second input system in which an upper part of a coil spring arranged on an outer circumference of said strut is connected to the side of said vehicle body via an upper spring seat and a bearing, wherein:
    said strut suspension system comprises a lower bracket arranged in direct contact with a lower surface of said insulator and between said bearing and said vehicle body and formed such that said lower bracket downwardly extends to greater extent on an inner side thereof as viewed in a lateral direction of said vehicle than on an outer side thereof to have an axis of rotation of said bearing and a king pin axis coincided with each other.

2. A strut suspension system with dual-path top mounts according to claim 1, wherein said lower bracket is configured to have, on a contact portion thereof with said insulator, a plane lying at a right angle to a strut axis and, on a bearing support portion thereof for said bearing, a plane lying at a right angle to said king pin axis.

3. A strut suspension system with dual-path top mounts according to claim 2, wherein said lower bracket is provided on an outer circumference of said insulator contact portion thereof with said bearing support portion.

4. A strut suspension system with dual-path top mounts according to claim 3, further comprising a bump rubber arranged on an outer circumference of said piston rod, said bump rubber being disposed below said insulator with only said lower bracket interposed therebetween.

5. A strut suspension system with dual-path top mounts according to claim 4, wherein said bump rubber is in contact at an upper end thereof with a plane which lies at a right angle to said strut axis at said contact portion of said lower bracket with said insulator.

6. A strut suspension system with dual-path top mounts according to claim 1, wherein said lower bracket is connected to said vehicle body at a portion in contact with the vehicle body.

* * * * *